US009871399B2

(12) United States Patent
Mittleman et al.

(10) Patent No.: US 9,871,399 B2
(45) Date of Patent: Jan. 16, 2018

(54) DOOR LOCK

(71) Applicant: Google Inc., Mountain View, CA (US)

(72) Inventors: Adam Duckworth Mittleman, Redwood, CA (US); Peter Privitera, San Francisco, CA (US); John Benjamin Filson, San Carlos, CA (US); Kevin Booth, Palo Alto, CA (US); Kenneth Arthur Jenks, Capitola, CA (US); Mark Kraz, Santa Clara, CA (US); Jason Chamberlain, Campbell, CA (US)

(73) Assignee: Google LLC, Mountain View, CA (US)

( * ) Notice: Subject to any disclaimer, the term of this patent is extended or adjusted under 35 U.S.C. 154(b) by 195 days.

(21) Appl. No.: 14/984,635

(22) Filed: Dec. 30, 2015

(65) Prior Publication Data

US 2017/0191287 A1 Jul. 6, 2017

(51) Int. Cl.
*E05B 45/06* (2006.01)
*H02J 7/02* (2016.01)
(Continued)

(52) U.S. Cl.
CPC .............. *H02J 7/025* (2013.01); *E05B 41/00* (2013.01); *E05B 45/06* (2013.01); *E05B 47/0046* (2013.01); *E05B 47/026* (2013.01); *E05B 63/242* (2013.01); *E05F 15/72* (2015.01); *E06B 5/11* (2013.01); *G07C 9/00563* (2013.01); *E05B 47/0012* (2013.01); *E05B 2047/0048* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 3,806,171 | A | 4/1974 | Fernandez et al. |
| 4,482,177 | A | 11/1984 | Nagy et al. |

(Continued)

FOREIGN PATENT DOCUMENTS

| | | | | |
|---|---|---|---|---|
| EP | 0557861 | A2 * | 9/1993 | ............ E05B 17/22 |
| WO | 2014092259 | A1 | 6/2014 | |

OTHER PUBLICATIONS

Glenn Derene "Ditch the Keys: It's time to Get a Smart Lock" Nov. 26, 2013, pp. 1-11, http://www.popularmechanics.com/home/how-to/a9729/ditch-the-keys-its-time-to-get-a-smart-lock-16200140/.

*Primary Examiner* — Brian Zimmerman
*Assistant Examiner* — Cal Eustaquio
(74) *Attorney, Agent, or Firm* — Morris & Kamlay LLP

(57) ABSTRACT

A door lock apparatus, comprising a male component; a connection to a power source; a lock actuator, powered by the power source and configured to move the male component at least partially through a strike and into a box beyond the strike in the path of the male component to lock a door, wherein the male component comprises a plurality of parallel subcomponents oriented lengthwise in the direction of a path of the male component; a bed of sensors positioned in the box and configured to sense a number of parallel subcomponents that contact the bed after the male component has been moved into the box; and an alarm in communication with the bed, wherein the alarm is triggered when an attempt is made to lock the door and an insufficient number of parallel subcomponents contacting the bed has been sensed by the bed of sensors.

23 Claims, 17 Drawing Sheets

(51) Int. Cl.

| | |
|---|---|
| ***E05F 15/72*** | (2015.01) |
| ***E05B 41/00*** | (2006.01) |
| ***E06B 5/11*** | (2006.01) |
| ***E05B 47/00*** | (2006.01) |
| ***G07C 9/00*** | (2006.01) |
| ***E05B 47/02*** | (2006.01) |
| ***E05B 63/24*** | (2006.01) |

(52) U.S. Cl.

CPC ................. *E05B 2047/0059* (2013.01); *E05B 2047/0061* (2013.01); *E05B 2047/0062* (2013.01); *E05B 2047/0064* (2013.01); *E05B 2047/0067* (2013.01); *E05B 2047/0071* (2013.01); *E05B 2047/0094* (2013.01); *G07C 2009/00634* (2013.01)

(56) References Cited

U.S. PATENT DOCUMENTS

| | | | |
|---|---|---|---|
| 4,656,850 | A | 4/1987 | Tabata et al. |
| 5,495,731 | A | 3/1996 | Riznik et al. |
| 5,542,720 | A | 8/1996 | Fleming et al. |
| 2010/0060414 | A1 | 3/2010 | Im et al. |

* cited by examiner

DOOR LOCK

BACKGROUND

Traditional home door locks require a user to manually set a deadbolt and/or a latch mechanism to lock the door. This may be accomplished by turning a knob or pressing a mechanical button, for example. Such actions are not generally difficult for a user to perform. Nonetheless, there can be advantages to a door lock apparatus where the lock is electrically activated. For example, such a lock could be electrically connected to one or more sensors located elsewhere. If an attempted intrusion is detected at the home, an alarm condition may be raised. As a part of this alarm condition, electrically powered door locks may be automatically set to secure the home. If a fire is detected by a sensor, a different alarm condition may be asserted, whereby electrically powered door locks may be automatically reset, i.e., unlocked. This allows occupants to easily exit the home, particularly those who may have difficulty manipulating a traditional lock, such as children or elderly residents.

An electrically activated home door lock may be difficult to implement, however. The physical configuration of a door may not be stable over time, for example, which could hamper the operation of an electromechanical lock. A door or jamb may sag or warp over time, so that eventually a deadbolt may no longer fit easily through a strike. Such a condition may also be brought about by humidity, by temperature variations that expand and contract the door and jamb, or by repeated use of the door. Moreover, a door in a home may not have a ready power source with which to power a lock apparatus.

BRIEF SUMMARY

According to an embodiment of the disclosed subject matter, a door lock apparatus is described herein, comprising a male component; a connection to a power source; a lock actuator, powered by the power source and configured to move the male component at least partially through a strike and into a box beyond the strike in the path of the male component to lock a door, wherein the male component comprises a plurality of parallel subcomponents oriented lengthwise in the direction of a path of the male component; a bed of sensors positioned in the box and configured to sense a number of parallel subcomponents that contact the bed after the male component has been moved into the box; and an alarm in communication with the bed, wherein an alarm or alert condition is triggered when an attempt is made to lock the door and an insufficient number of parallel subcomponents contacting the bed has been sensed by the bed of sensors.

In an embodiment the lock actuator and the male component, when the door is unlocked, are positioned in a door, and the strike and the bed are positioned in a corresponding location in a door jamb. The power source may comprise a battery. The apparatus may further comprise a first induction coil wherein the battery is configured to be charged inductively by the first induction coil. The apparatus may further comprise a second induction coil positioned in the door jamb wherein the second induction coil, when energized, creates a field that induces current in the first induction coil. In an embodiment, the battery may be charged with harvested energy. The harvested energy may be harvested from one or more of: motion of the door; motion of a door handle; pressure applied by walking or standing on a pressure plate; a solar array; and a temperature gradient.

In another embodiment, the lock actuator and the male component, when the door is unlocked, may be positioned in a door jamb, and the strike and bed are positioned in a corresponding location in the door. The power source may comprise one or more of: a household power source; a telephone landline power source; and an Ethernet power source. Alternatively the power source may comprise a battery. The battery may be charged with harvested energy. The harvested energy may be harvested from one or more of: motion of the door; motion of a door handle; pressure applied by walking or standing on a pressure plate in a floor; a solar array; and a temperature gradient. The temperature gradient exists between a temperature on a first side of the door and a temperature on a second side of the door.

In an embodiment, the parallel subcomponents are approximately 2 millimeters in width. The parallel subcomponents may be hexagonal in cross-section.

The apparatus may further comprise an authentication module, configured to permit opening of the door when an authentication process, performed by the authentication module, is successful. The authentication module may comprise an authentication input module and authentication logic figured to perform the authentication process. The authentication input module may be configured to receive data from a user, the data characterizing one or more of: a fingerprint of the user; a face of the user; a voice of the user; and a retina of the user.

The apparatus may further comprise a door handle, a proximity sensor, and a handle actuator, wherein, when the proximity sensor detects a person or a token within a predetermined distance from the proximity sensor, the handle actuator moves the door handle from a recessed position to an extended position.

The lock actuator may be configured to retract the male component from the strike if the lock actuator receives an indication of a fire. The lock actuator may be configured to move the male component into the strike if the lock actuator receives indication of a security threat.

The apparatus may further comprise a retainer configured to move into a position to capture the male member once the male member has been moved into the box.

According to an embodiment of the disclosed subject matter, a method is provided where, after an attempt has been made to lock a door, determining a number of parallel subcomponents of a male component of a door lock apparatus that have contacted a bed of sensors in a box of a door lock apparatus; comparing the determined number to a threshold minimum; and if the determined number is less that the threshold minimum, asserting an alarm condition indicating that the door is not securely locked.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

According to an embodiment of the disclosed subject matter, a door lock apparatus is described herein, comprising a male component; a connection to a power source; a lock actuator, powered by the power source and configured to move the male component at least partially through a strike and into a box beyond the strike in the path of the male component to lock a door, wherein the male component comprises a plurality of parallel subcomponents oriented lengthwise in the direction of a path of the male component; a bed of sensors positioned in the box and configured to sense a number of parallel subcomponents that contact the bed after the male component has been moved into the box; and an alarm in communication with the bed, wherein an alert or alarm condition is triggered when an attempt is made to lock the door and an insufficient number of parallel subcomponents contacting the bed has been sensed by the bed of sensors.

Figure 1:
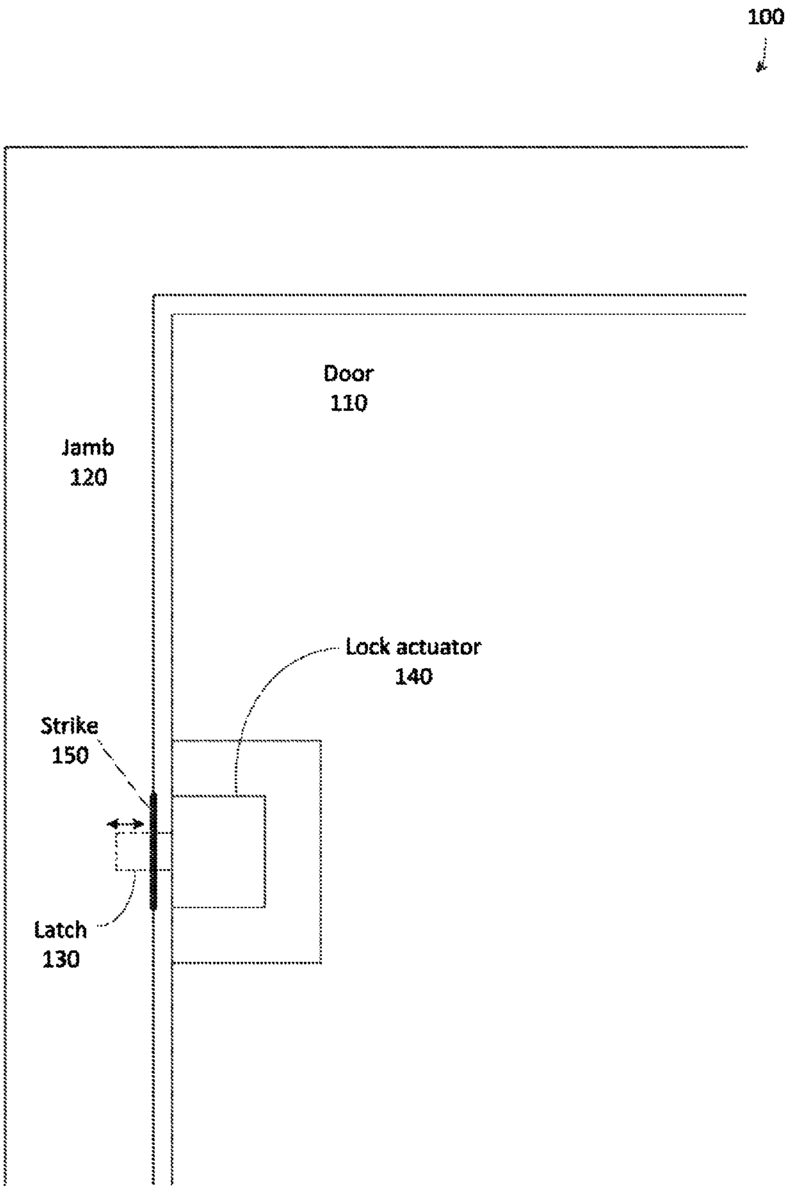
FIG. 1 shows a door lock apparatus according to an embodiment of the disclosed subject matter.

In an embodiment, a door may be locked by the movement of a male component from a mechanism in a door into an opening in a door jamb, where the opening is located opposite the mechanism. Such an embodiment is illustrated in FIG. 1. Here, the mechanism in door 110 includes an electromechanical lock actuator 140. The lock actuator 140 is configured to push a male component, such as a latch 130, through a strike 150 and into an opening or box in jamb 120. The male component may be a deadbolt instead of the latch 130. As will be discussed below, the lock actuator 140 may be connected to a power source (not shown) to enable operation. The lock actuator 140 may include, for example, a motor that pushes the latch 130 into the jamb 120 to lock door 110 and retracts the latch 130 to unlock it.

Figure 2:
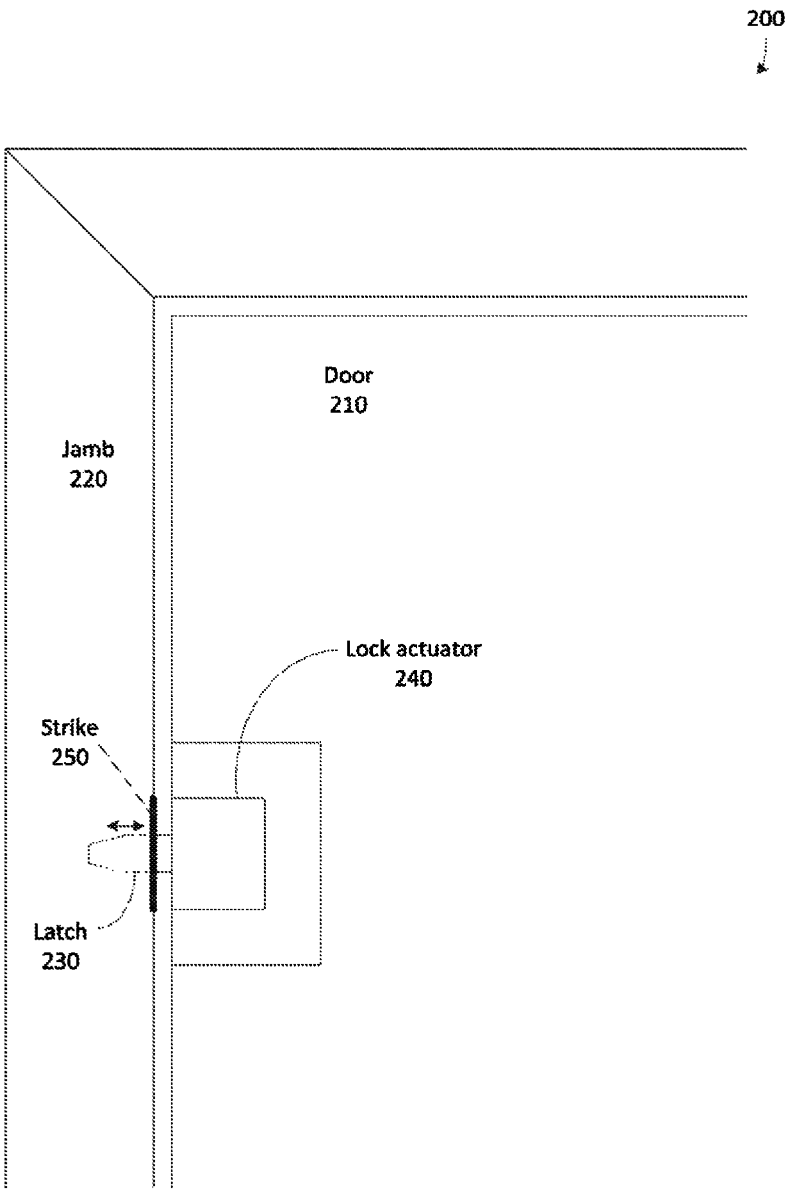
FIG. 2 shows a door lock apparatus with a tapered deadbolt or latch, according to an embodiment of the disclosed subject matter.

In some situations, the male component may not be properly aligned with the strike. The door or jamb may have settled or warped over time, for example, due to humidity, heat, age, or repeated use of the door. As a result, the male component may have become slightly misaligned with the opening in the strike. If the opening of the strike is only slightly larger than the cross section of the male component, then even a minor misalignment of the two may make it difficult or impossible to lock or latch the door. This problem may be addressed by using a male component that is not rectangular, but is instead tapered. This is illustrated in FIG. 2. Here, the latch 230 is shown having a tapered shape, so that the end is narrower in both height and width than the larger cross section of the latch. As a result, even with some misalignment, the end of latch 230 will be able to pass through the strike 250. With sufficient force from the lock actuator 240, the rest of latch 230 can then be pushed through the strike 250. In an embodiment, the male component (e.g., latch 230) may not be rectangular in cross section, but may instead be circular or elliptical in cross section, both in the tapered portion and in any untapered portion.

Figure 3A:
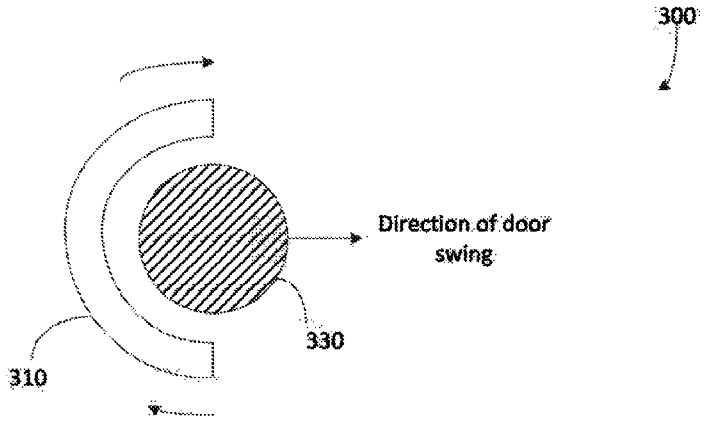
FIGS. 3*a* and 3*b* show a door lock apparatus that includes a retainer component, according to an embodiment of the disclosed subject matter.
Figure 3B:
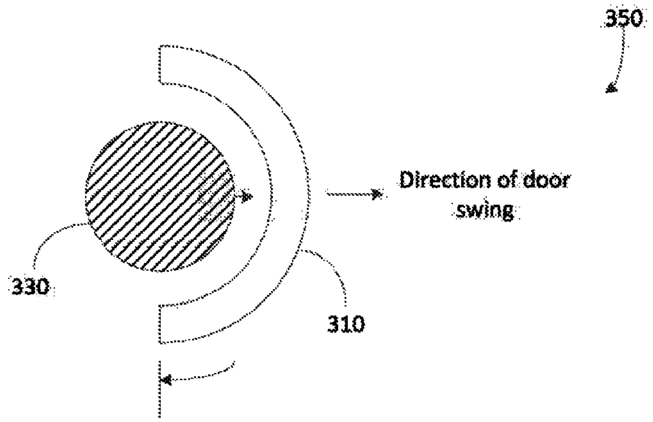

When the male member has moved through the strike into the box and is in the locked position, a retention mechanism may be activated to capture the male member to hold it (and the door) in place. This is illustrated in FIGS. 3*a* and 3*b*, according to an embodiment. The male member (e.g., the latch or deadbolt) 330 is shown in cross section. When the male member 330 has completed its movement through the strike, a retention mechanism may be triggered, shown in part as retainer 310. The retainer 310 may be semicircular (in the approximate shape of a half-ring), or may have a shape that extends parallel to the male member (in the approximate shape of a half-cylinder). The retainer 310 may be spring loaded, so that the male member 330, when placed in the locked position, exerts pressure on a mechanical trigger (not shown) in the box. This may result in releasing or pushing retainer 310 to rotate about the male member 330 as indicated by the curved arrows in FIG. 3*a*. The resulting configuration is shown in FIG. 3*b*, where the retainer has moved to the other side of male member 330, blocking the male member 330 from moving in the direction of the door's movement as it would otherwise open. The retainer 310, when in place as shown in FIG. 3*b*, serves to secure the male member 330 and prevent the door from opening. While the strike itself may perform this function to an extent, the retainer 330 may serve to further secure the door. Retraction of the male member 330 may trigger the retainer 310 to return to its original position (shown in FIG. 3*a*).

In an alternative embodiment, the operation of the retainer 330 may be electromechanical. Here, when the male member 330 has completed its movement through the strike, the presence of the male member 330 may be sensed, activating a motor to move or rotate the retainer 310 into place. Power for the motor may be supplied by any of the methods described below. Again, retraction of the male member 330 may trigger the motor to return the retainer 310 to its original position (shown in FIG. 3*a*).

Figure 4:
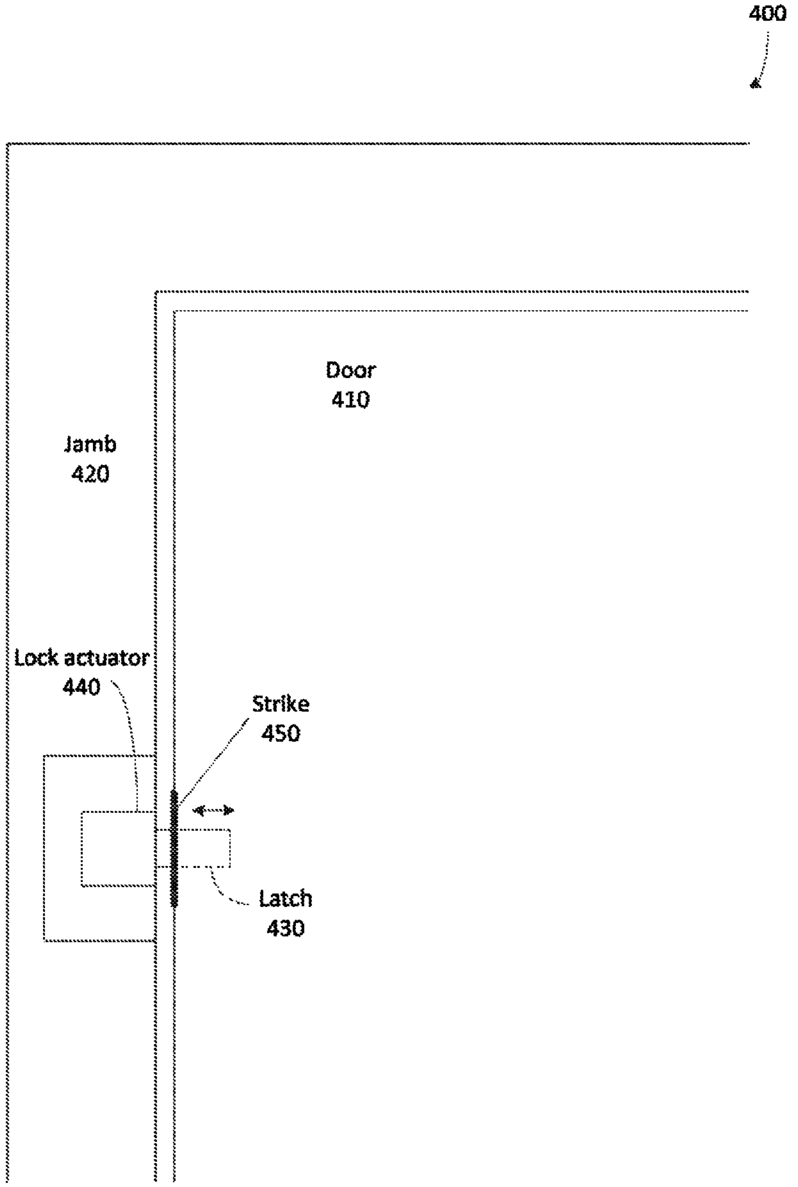
FIG. 4 shows a door lock apparatus according to an embodiment of the disclosed subject matter.

In an embodiment, the lock actuator may be located in the jamb and configured to push the male component into an opening or box in the door to achieve a locked state. This is illustrated in FIG. 4, for example. Here, a lock actuator 440 is situated in jamb 420 and configured to lock the door 410 by pushing a male component such as a deadbolt or latch 430 through a strike 450 into an opening or box in door 410. The lock actuator 440 is further configured to retract the latch 430 to unlock the door 410. The lock actuator 440 may be connected to a power source to enable operation, as will be described below. It should be noted that in this figure (and in all subsequent figures), the male component is shown as rectangular. In alternative embodiments, described here and henceforth, the male component may alternatively have a tapered shape as shown in FIG. 2.

Figure 5:
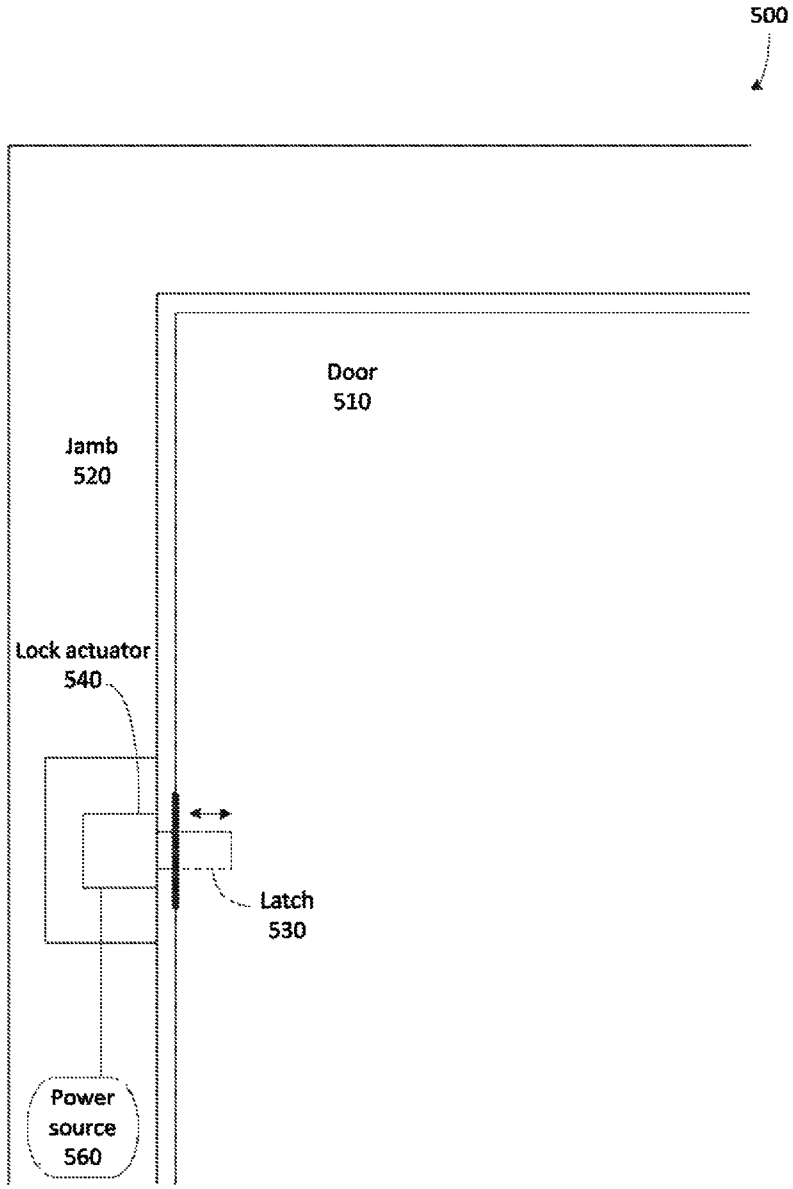
FIG. 5 shows a directly powered door lock apparatus according to a further embodiment of the disclosed subject matter.

In an embodiment, the lock actuator may be powered directly. This is illustrated in FIG. 5. In this embodiment, the lock actuator 540 is positioned in jamb 520 and configured to move a male component such a deadbolt or latch 530 into a box or opening in a door 510 to achieve a locked state. The lock actuator 540 is powered by a power source 560. As in the case of the embodiment illustrated in FIG. 5, the power source 560 may be a normally available household power source, or may be a power supply connected to the household power source. The household power may be the 120 volt AC power typically available in U.S. homes for example, the power available through a telephone landline, or the power available through an Ethernet connection, for example and without limitation.

Figure 6:
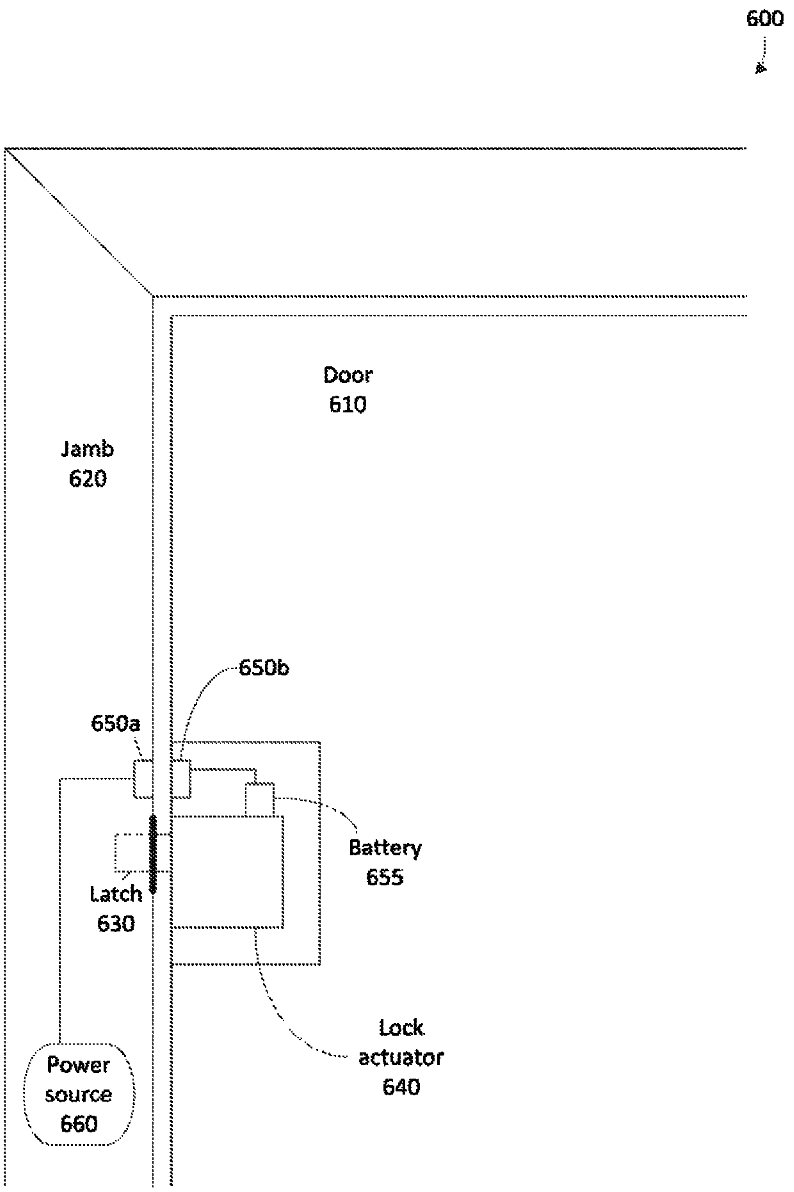
FIG. 6 shows an inductively charged battery in a door lock apparatus according to a further embodiment of the disclosed subject matter.

In an embodiment, power may be provided to a lock actuator by a battery. The battery may be replaceable and/or rechargeable. Such an embodiment is shown in FIG. 6. Here, lock actuator 640 is positioned in a door 610 and configured to move a male component, e.g., deadbolt or latch 630, into a door jamb 620 in order to lock the door 610. The operation of the actuator 640 may be powered by a battery 655.

In the illustrated embodiment, the battery 655 is rechargeable. Recharging may be performed inductively. A first inductive coil 650*a* is situated in the jamb 620. The first inductive coil 650*a* may be energized by a power source 660. The power source 660 may be a normally available household power source, or may be a power supply connected to household power. The household power may be the 120 volt alternating current (AC) power typically available in U.S. homes for example. Alternatively, the household power used here may be the power available through a telephone landline or the power available through an Ethernet connection, for example and without limitation.

When the door 610 is in the closed position, a second inductive coil 650*b*, positioned in door 610, may be located adjacent the first coil 650*a*. When the first coil 650*a* is energized, the resulting field induces a current in the second coil 650*b*. This current can then be used to charge the battery 655.

The embodiment of FIG. 6 shows the lock actuator 640 and the inductively charged battery 655 positioned in the door 610. In an embodiment, the actuator and battery may be positioned in the jamb, so that the door is locked by movement of the deadbolt or latch from the jamb into the door.

Figure 7:
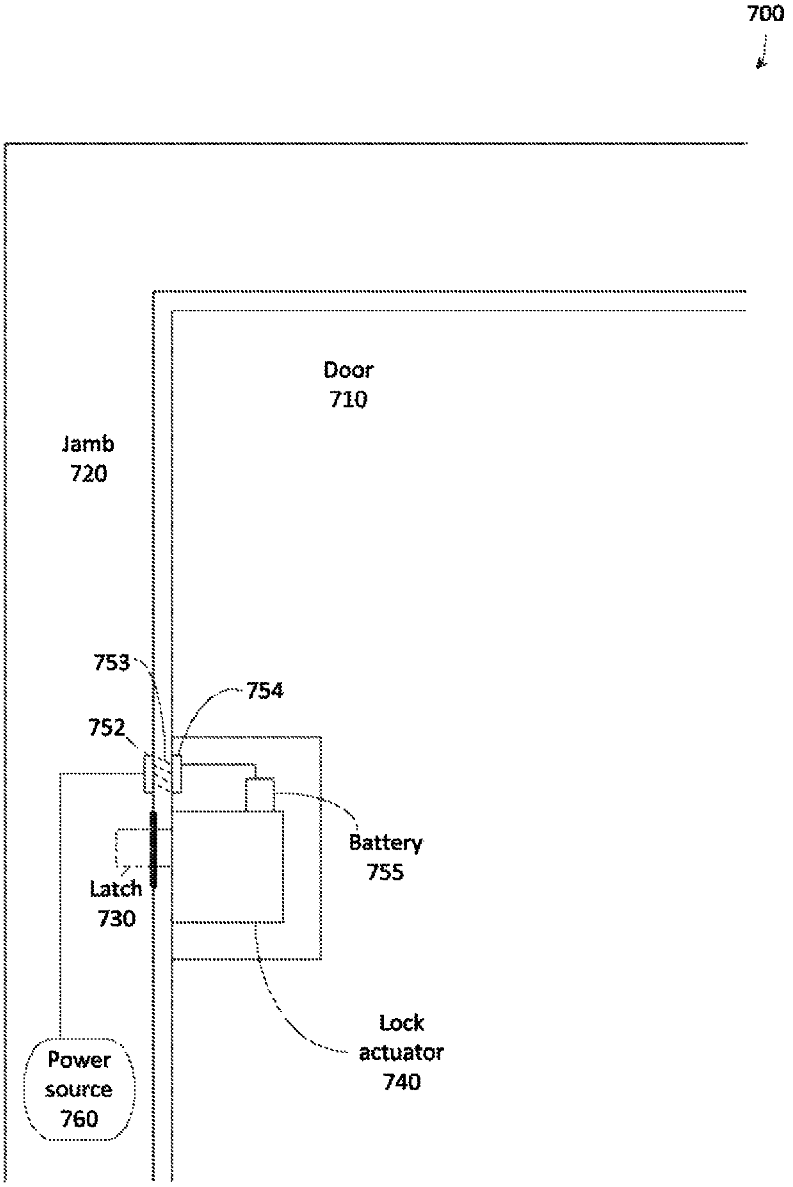
FIG. 7 shows a directly charged battery in a door lock apparatus according to a further embodiment of the disclosed subject matter.

In an alternative embodiment shown in FIG. 7, the power souce 760 is connected to a first conductive component 752. Attached to the first conductive component 752 are one or more flexible conductive components 753. When the door 710 is in the closed position, a second conductive component 754, positioned in door 710, may contact the flexible conductive component 753. This allows power to flow from power source 760 to the battery 755, thereby charging it when the door 710 is closed. In an embodiment, the first conductive component 752 may be integrated with or attached to the strike plate.

Alternatively, the flexible conductive components 753 may be attached to the second conductive component 754, which is positioned in the door 710. Here, when the door 710 is closed, the flexible conductive components 753 make contact with the first conductive component 752 in the jamb 720. This allows power to flow from power source 760 to the battery 755, thereby charging it.

Regardless of where the conductive component 753 is attached, in a further embodiment, the battery 755 may not be used. In this case, power would flow from source 760 directly to the lock actuator 740 when the door 710 is closed.

Figure 8:
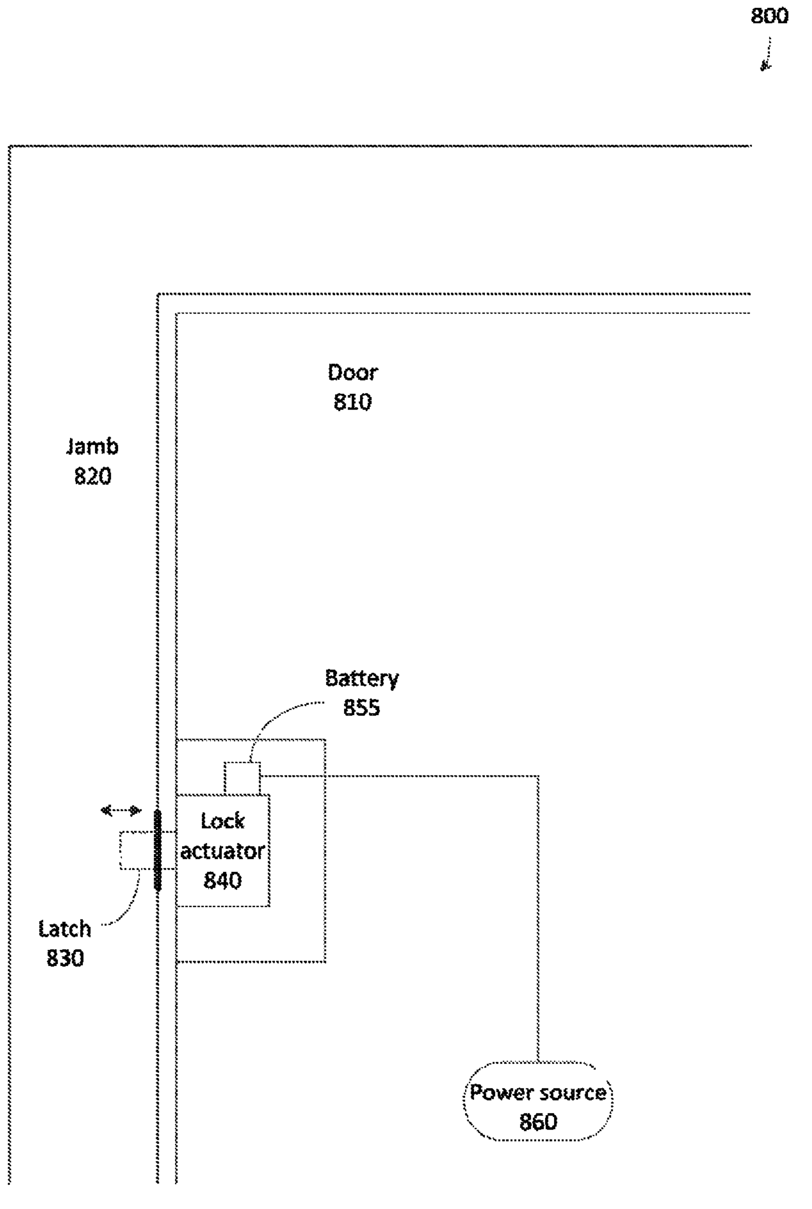
FIG. 8 shows a directly charged door lock apparatus according to an embodiment of the disclosed subject matter.

The actuator may be powered by a battery that is recharged directly, without induction and without a flexible conductive component to bridge the gap between the door and the jamb. This is shown in FIG. 8. In the illustrated embodiment, a lock actuator 840 is connected to a battery 855. If this is a rechargeable battery, then a power source 860 may be used to keep the battery 855 charged. The power source 860 may use any of several energy harvesting technologies. For example, power source 860 may be solar. If door 810 faces outside, this may be implemented by placement of a solar panel (not shown) on the exterior side of door 510. Otherwise such a solar panel may be placed anywhere that is suitable for purposes of collecting sufficient light and for allowing connectivity to battery 855 situated in door 810. In addition or as an alternative, the power source 860 may use a thermal differential that may exist between the two sides of the door 810, or that may exist over time on one side of the door 810 (i.e., thermal cycling) in order to charge battery 855.

Mechanical events that occur during normal operation may be used to generate electricity to charge battery 855. In an embodiment, the turning of a door knob or lever when opening or closing door 810 may be used as power source 860. The movement of door 810 on its hinges may also be used. A pressure plate in the floor may also be used to capture energy from foot traffic and act as power source 860. Alternatively, any or all of these mechanical, thermal, or solar processes may be used together to serve collectively as power source 860.

Figure 9:
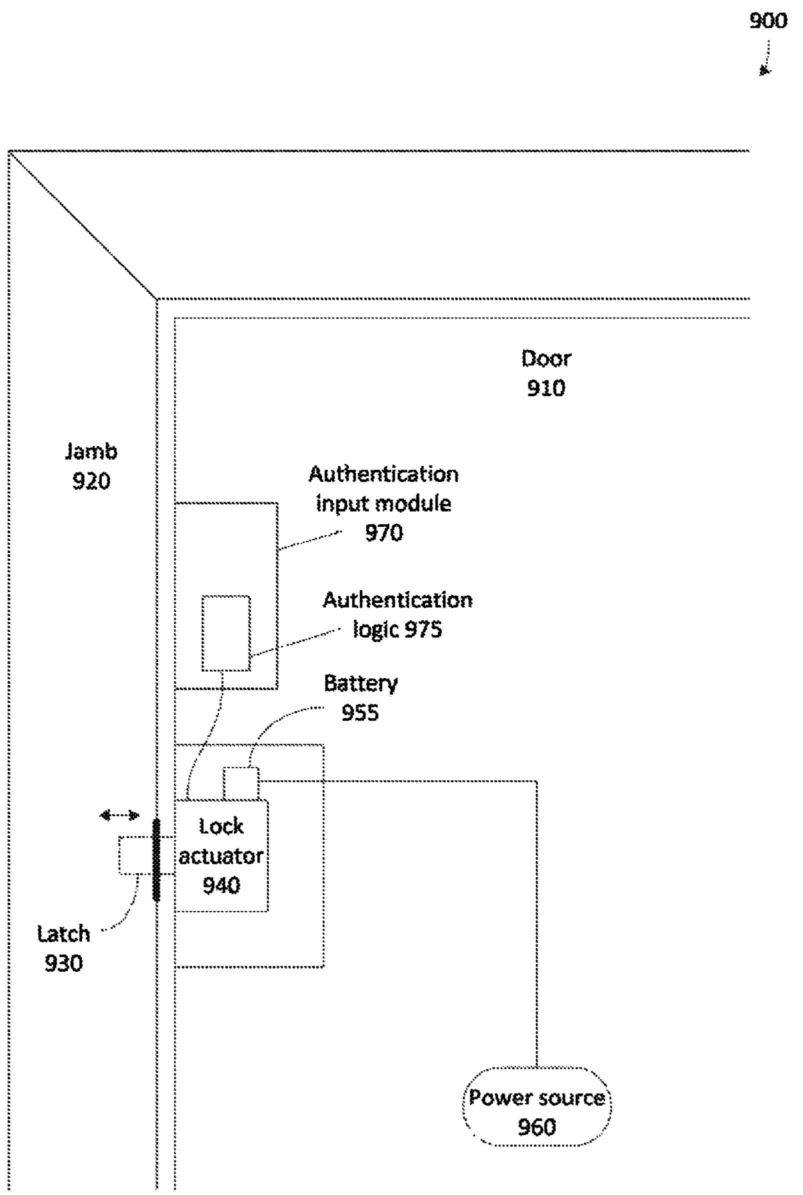
FIG. 9 shows a door lock apparatus that includes authentication functionality, according to an embodiment of the disclosed subject matter.

Embodiments may also include authentication functionality. Such an embodiment is illustrated in FIG. 9. An authentication process may prompt a user to provide information to an authentication input module 970, where this information identifies the user and/or establishes that he is authorized to open the door. The authentication input module 970 may take the form of a biometric sensor configured to capture user-specific anatomical information from the user. Such information may include a fingerprint, a pore pattern from a fingertip, and/or a configuration of blood vessels in the retina of the user for example. The captured information may be processed in an authentication logic module 975. In an embodiment, the authentication logic module 975 compares the captured anatomical information to known acceptable information, e.g., each of the fingerprints of respective authorized users. A successful match results in a signal being sent to the lock actuator 940, enabling the withdrawal of the deadbolt or latch 930 to unlock the door 910. The authentication process may alternatively rely on non-biological data. For example, the user may instead use a keypad incorporated into authentication input module 970 to enter a password or personal identification number (PIN). This information would then be verified at the authentication logic module 975. As before, the lock actuator 940 would then be enabled to unlock door 910 by retracting deadbolt or latch 930 if verification is successful. The processing of the authentication logic module 975 may be implemented in software, firmware, hardware, or any combination thereof. In addition, the authentication logic module 975 may alternatively be located remotely from the door 910, e.g., in a computing device such as a centralized controller or server, elsewhere in the building or campus. Connectivity between the door 910 and the authentication logic 975 in such a case may be implemented using any communications and/or networking technology known to persons of skill in the art.

Figure 10:
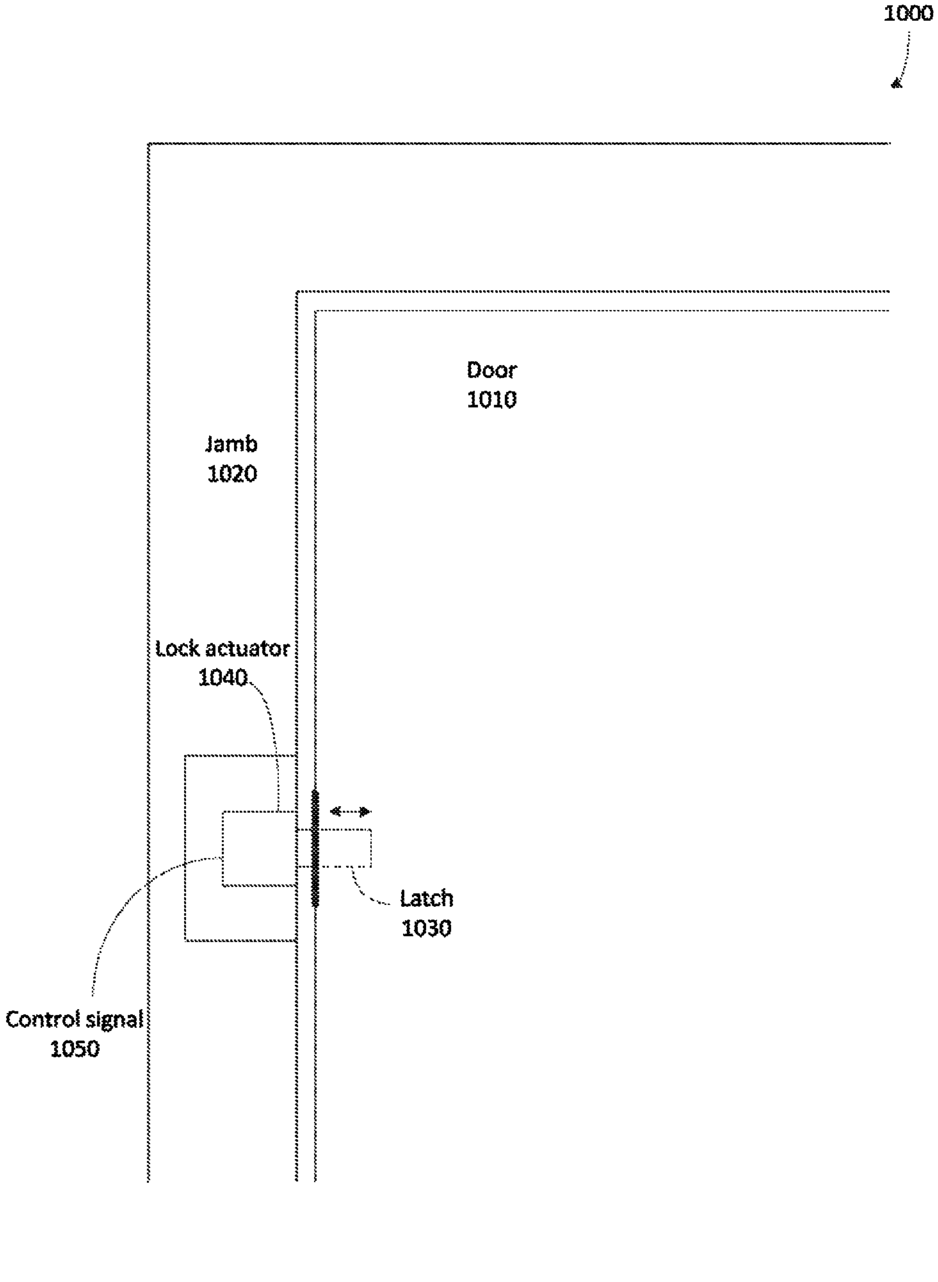
FIG. 10 shows a door lock apparatus that may be controlled by a control signal, according to an embodiment of the disclosed subject matter.

In embodiments, the lock actuator may be controlled by a control signal. Such an embodiment is shown in FIG. 10. Under normal operation, the lock actuator 1040 may extend or retract the male component (e.g., deadbolt or latch 1030) on the basis of a user input, such as manipulation of a button and/or the provision of an authentication input as described above. Such actions may then trigger control signal 1050. In response, the lock actuator 1040 will then lock or unlock the door 1010.

In some embodiments, the control signal 1050 may also be triggered by other sensors external to the door lock apparatus, e.g., elsewhere in the building. Such connectivity may be provided by a local network, for example. This enables the lock actuator 1040 to be responsive to emergency conditions. For example, a fire alarm may be connected to lock actuator 1040 via the control signal 1050, so that assertion of the fire alarm results in the unlocking of door 1010. The detection of other hazardous conditions (e.g., smoke, carbon monoxide, etc.) may similarly result in the assertion of control signal 1050. Similarly, a security sensor may activate an alarm (e.g., a burglar alarm) and may also be connected to lock actuator 1040 via the control signal 1050, so that assertion of the intrusion alarm results in the locking of door 1010. In other embodiments, the emergency condition may arise external to the building in which door 1010 is situated. If this building is part of a campus, a security alert elsewhere on the campus may trigger assertion of control signal 1050 through a data network, causing the lock actuator 1040 to extend the latch 1030 and lock the door 1010.

Figure 11:
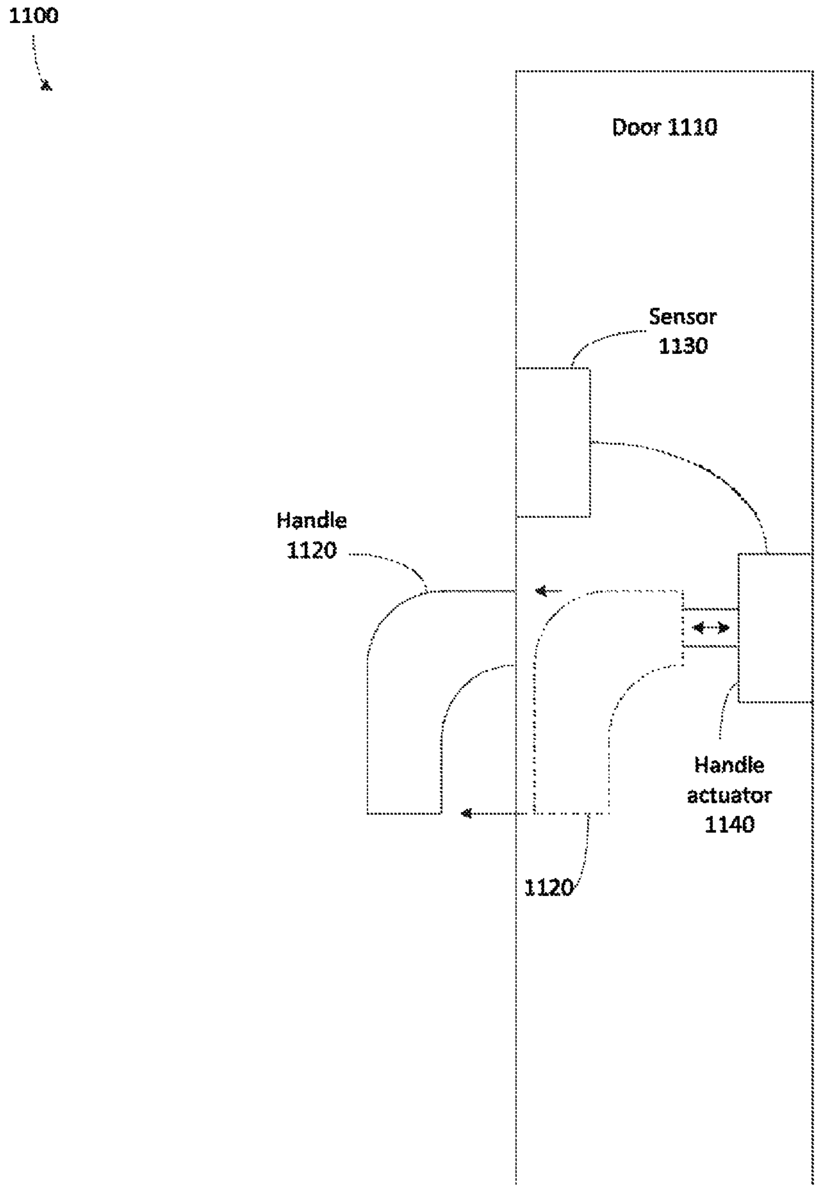
FIG. 11 shows a door lock apparatus having an extendable handle, according to a further embodiment of the disclosed subject matter.

In an embodiment, the door handle or knob may normally be in a recessed location in a door and extended to a user when the handle is needed. This is illustrated in FIG. 11, according to an embodiment. A door handle 1120 may be normally stored in a recessed position within door 1110. When the handle 1120 is needed by a user in order to open or close the door 1110, the handle 1120 may be pushed out as shown from its recessed position, into a position where it may be manipulated by the user. This presentation of the handle 1120 may be accomplished by a handle actuator 1140. Power may be supplied to the handle actuator 1140 using any of the arrangements discussed above with respect to actuation of a lock.

In an embodiment, the presentation of the door handle 1120 to a user can be done automatically upon sensing the presence of the user. To accomplish this, a sensor 1130 may be positioned in the door 1110 so as to detect the presence of the user. The sensor 1130 may be an infrared (IR) sensor, for example and without limitation. In this case, when the sensor 1130 detects a threshold level of IR radiation, a signal may be sent to handle actuator 1140. This would cause handle actuator 1140 to push out handle 1120 from its recessed position. In an embodiment, the sensor 1130 may be a touch sensitive sensor configured to detect physical contact of a user. As in the previously discussed embodiment, this would result in a signal being sent to the handle actuator 1140, which would then push out the handle 1120. The sensor 1130 may be configured to detect a token or other device possessed by a user, such as a key fob. If sensor 1130 detects such a device, this would result in a signal being sent to the handle actuator 1140, which would then push out the handle 1120.

Figure 12:
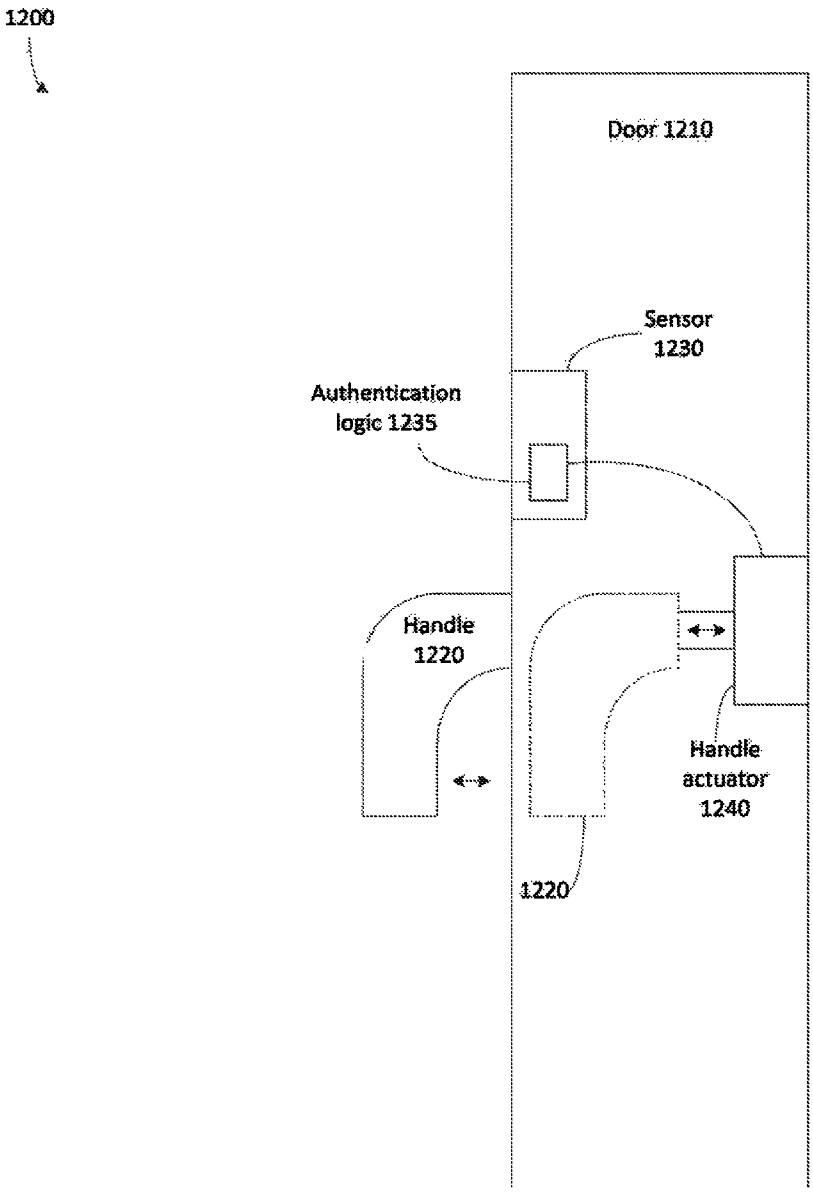
FIG. 12 shows a door lock apparatus having an extendable handle and authentication functionality, according to an embodiment of the disclosed subject matter.

The sensor may also include authentication functionality. This is illustrated in FIG. 12, according to an embodiment. Authentication may require a user to provide information to an authentication input module, where this information serves to identify the user and/or establish that he is authorized to open the door. Here, the authentication input module takes the form of sensor 1230. This may be a biometric sensor configured to capture anatomical information from the user, such as a fingerprint, a pore pattern from a fingertip, or a configuration of blood vessels in the retina of the user for example. The captured information may be processed in an authentication logic module 1235. In an embodiment, the authentication logic module 1235 compares the captured anatomical information to known acceptable information, e.g., each of the fingerprints of respective authorized users. A successful match results in a signal being sent to the handle actuator 1240, enabling the presentation of the handle 1220 to the user. The authentication process may rely on non-biological data. For example, the user may instead use an authentication input module such as a keypad to enter a password or personal identification number. This information would then be verified at the authentication logic module 1235. As before, the handle actuator 1240 would then be enabled.

Figure 13A:
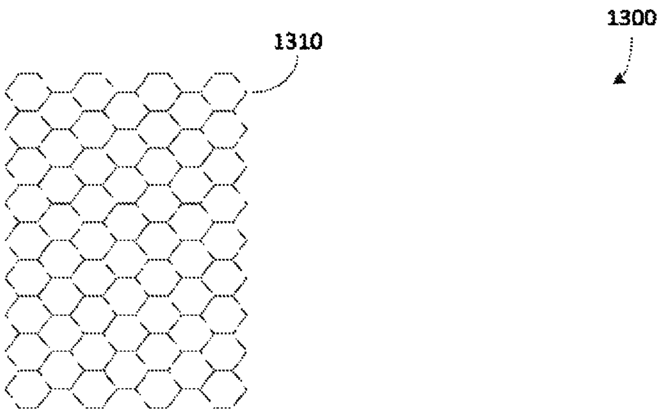
FIGS. 13A and 13B show a male component of a door lock apparatus according to a further embodiment of the disclosed subject matter.
Figure 13B:
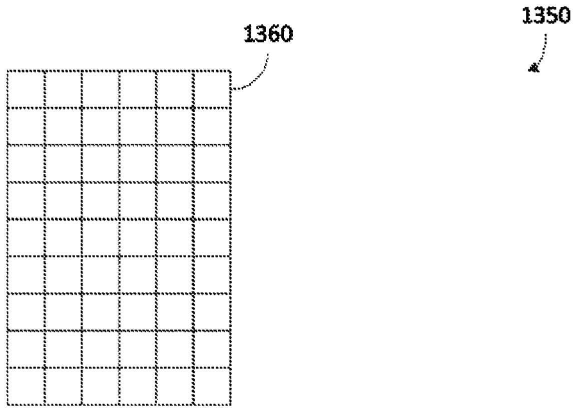
Figure 14:
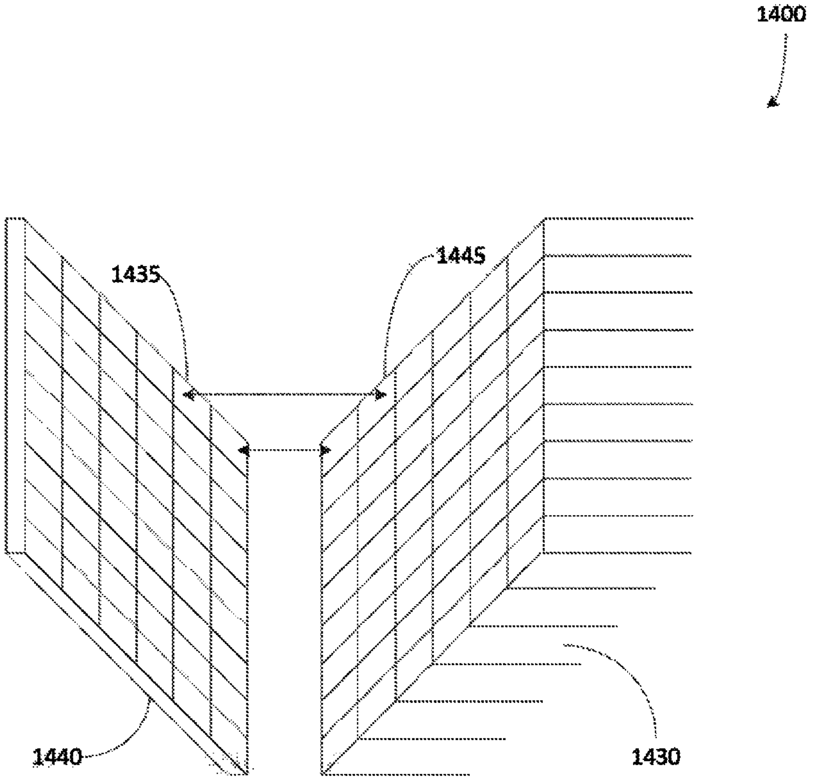
FIG. 14 shows a a male component and a sensor bed for a deadbolt according to a further embodiment of the disclosed subject matter.

In an embodiment, the male component may not be a single component, but may include multiple parallel subcomponents oriented lengthwise. This is illustrated in FIGS. 13A, 13B, and 14. In FIG. 13A, the male component and its constituent parallel subcomponents are shown in cross section. In this example, the male component may be a deadbolt. Each parallel subcomponent, such as subcomponent 1310, may be hexagonal in cross section as shown. In an embodiment, each parallel subcomponent may be approximately 2 mm across as measured in cross section. In an embodiment, the parallel subcomponents may be rectangular or square in cross section, as shown in FIG. 13B. In an embodiment, each parallel subcomponent may be approximately 2 mm across as measured in cross section. An embodiment using parallel subcomponents is further illustrated in FIG. 14. Here, a male component 1430 is shown and consists of multiple parallel subcomponents that are rectangular in cross section, such as subcomponent 1445. More generally, the subcomponents may have any desired cross-section to achieve a desired overall shape of the male component. The subcomponents may have a uniform cross-section, or may have different cross-sections. For example, some or all of the outermost subcomponents may have protrusions, hollows such as notches and the like. Such features may be used, for example, to allow for additional functionality or detection of when particular subcomponents are in an extended state, or as an additional security measure such as to prevent a "blank" subcomponent from being inserted in place of the subcomponent.

In the embodiment of FIG. 14, the door may be locked by moving the male component 1430 from a door into a box in the jamb; alternatively, if the male component 1430 is normally situated with its actuator in the jamb, the door may be locked by moving the male component 1430 into a box in the door. Sometimes, however, the male component 1430 may not easily fit into the box. This may be the case, for example, if the door has moved slightly out of its normal alignment over time due to wear or warping of the door. In such a case, an attempt may be made to move the male component 1430 through the strike and into the box, but not all the subcomponents will successfully enter the box. Rather, only a subset of the subcomponents will be able to do so. In this situation, some of the subcomponents will extend through the strike, while others will not.

In the illustrated embodiment, a bed of sensors 1440 may be situated at the base of the box, where the male component 1430 would normally be seated when the door is locked. The bed of sensors 1440 may be configured to determine the number (or approximate number) of parallel subcomponents of male component 1430 to have successfully extended through the strike and into the box. In an embodiment, the door will only be considered to have been successfully locked if a predetermined number of parallel subcomponents have reached the bed of sensors 1440. If fewer than this predetermined number of parallel subcomponents has reached the bed of sensors 1440, then the user can be notified that the lock may not be secure, despite the lock actuator having attempted to move the male component and its parallel subcomponents into the opening. In the illustrated embodiment, the bed of sensors 1440 may include a sensor for each parallel subcomponent. For example, if all parallel subcomponents successfully extend through the opening and contact the bed of sensors 1440, parallel subcomponent 1445 will contact sensor 1435. In an embodiment, this contact will complete an electrical circuit specific to sensor 1435. By having a sensor for each parallel subcomponent, the bed of sensors 1440 will be able to determine the number of parallel subcomponents that have successfully extended through the strike and into the box by determining the number of circuits that have been completed. In this way, it can be determined how many parallel subcomponents have reached the bed of sensors 1440.

Figure 15:
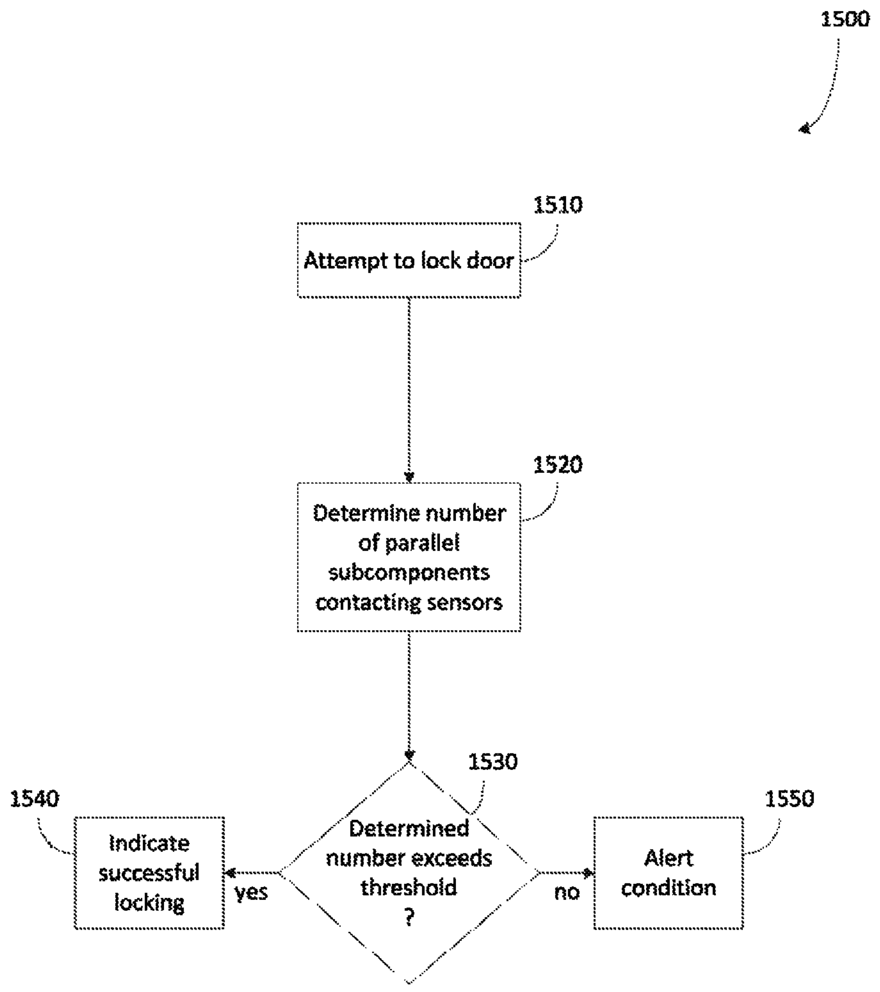
FIG. 15 is a flowchart illustrating a process for determining a securely locked state, according to an embodiment of the disclosed subject matter.

The processing that takes place in the implementation of FIG. 14 is illustrated in FIG. 15, according to an embodiment. At 1510, the user may attempt to lock the door. At 1520, a determination may be made as to the number of parallel subcomponents that have successfully contacted the corresponding sensors in the box. At 1530, a determination may be made as to whether this number exceeds a predetermined threshold. In the embodiment of FIG. 14, for example, 54 parallel subcomponents are shown. If the threshold is defined as 42, then the attempt at locking the door (see 1510) would be considered successful if 42 or more of the parallel subcomponents pass through the strike and successfully contact the bed of sensors. If the threshold is exceeded, then a sufficient number of parallel subcomponents have passed through the strike to the bed of sensors, representing a sufficiently secure locked condition. At 1540 an indication may be made to the user, showing that the locking attempt was successful. In an embodiment, such an indication may be visual (e.g., a light or a display of text) or auditory (e.g., a chime). If the threshold is not exceeded, then at 1550 an alert condition may be asserted. Given that too few parallel subcomponents have reached the bed of sensors in this case, the user may be informed that the door has not been securely locked. This notification may be visual or auditory. In an embodiment, the threshold value may be configured by a user or administrator. The alert condition may also be conveyed to an alarm or security system in the home or building in which the lock apparatus is located.

Embodiments disclosed herein may use one or more sensors for any of a variety of purposes. In general, the term "sensor" may refer to any device that can obtain information about its environment. Sensors may be described by the type of information they collect. Referring again to FIG. 14, the bed of sensors 1440 may be configured to determine the number (or approximate number) of parallel subcomponents of male component 1430 to have successfully extended through the strike. In the embodiment of FIG. 9, the authentication input module 970 may be a sensor for the detection of biometric information, for example. In the embodiment of FIG. 11, sensor 1130 may be configured to determine the presence of an IR source, for example.

Generally, sensors as disclosed herein may detect motion, smoke, carbon monoxide, proximity, temperature, time, physical orientation, acceleration, location, entry, presence, pressure, light, sound, user attributes, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of an animal or person, or attributes thereof. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a sensor as disclosed herein may include multiple sensors or sub-sensors. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 16:
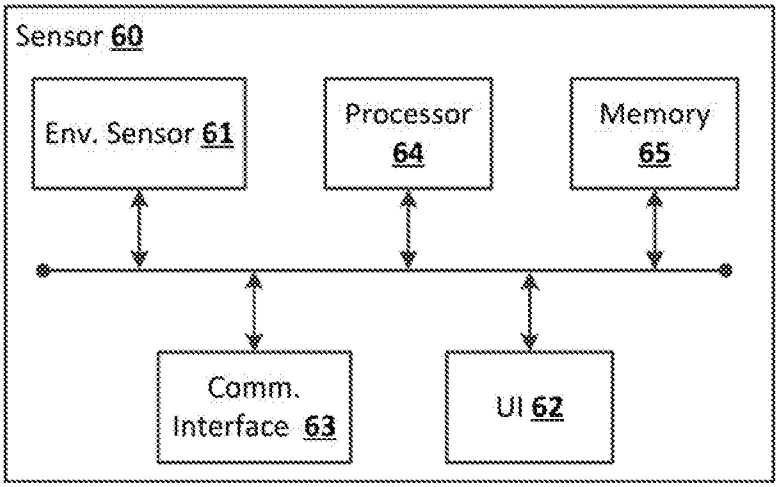
FIG. 16 illustrates a sensor, according to an embodiment of the disclosed subject matter.

A sensor may include hardware in addition to the specific physical sensor that obtains information about the environment. FIG. 16 shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, image sensor, humidity sensor, pressure sensor, microphone, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a wi-fi or other wireless interface, Ethernet or other local network interface, or the like may allow for communication by the sensor 60 with other devices. Interface 63 may be in communication with a lock actuator 1040 via control signal 1050, as discussed above with respect to FIG. 10, for example. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a more full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

As a specific example, a sensor may also take the form of authentication input module 970 of FIG. 9, sensor 1130 of FIG. 11, or sensor 1230 of FIG. 12. As described above, any of these sensors may receive information specific to the user, such as information related to a fingerprint, facial characteristics, the voice of the user, and/or the retina of the user.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network, that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

FIG. 14 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

Figure 17:
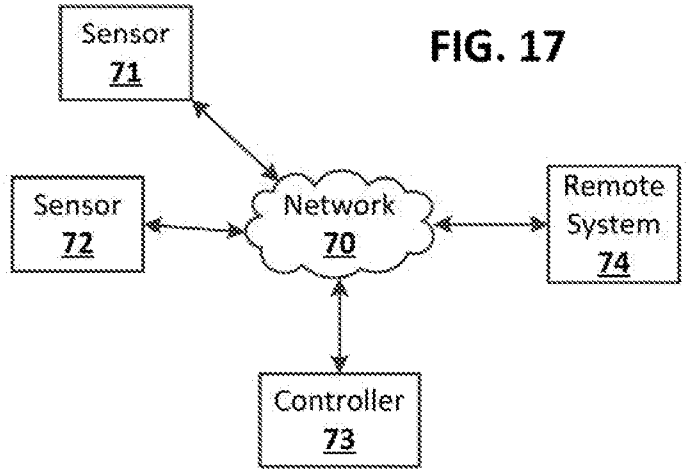
FIG. 17 illustrates networking of sensors, according to an embodiment of the disclosed subject matter.

The sensor network shown in FIG. 17 may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space. As described above, a sensor may be used to receive information specific to a user, where the information can authenticate the user. Depending on the outcome of an authentication process, the user may be permitted or denied access through a door. This may be achieved through permitting or disabling an unlock process, and/or granting or denying access to a door handle.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be be mounted on, integrated with and/or supported by a wall, floor, or ceiling of the structure.

The smart-home environment including the sensor network shown in FIG. 17 may include a plurality of devices, including intelligent, multi-sensing, network-connected devices, that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., “smart hazard detectors”), and one or more intelligent, multi-sensing, network-connected entryway interface devices (e.g., “smart doorbells”). The smart hazard detectors, smart thermostats, and smart doorbells may be the sensors 71, 72 shown in FIG. 17.

For example, a smart thermostat may detect ambient climate characteristics (e.g., temperature and/or humidity) and may control an HVAC (heating, ventilating, and air conditioning) system accordingly of the structure. For example, the ambient client charactieristics may be detected by sensors 71, 72 shown in FIG. 17, and the controller 73 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 17, and the controller 73 may control an alarm system to provide a visual and/or audible alarm to the user of the smart-home environment and or activate access control devices such as door lock apparatus 1000 of FIG. 10.

As another example, a smart doorbell may control doorbell functionality, detect a person’s approach to or departure from a location (e.g., an outer door to the structure), and announce a person’s approach or departure from the structure via audible and/or visual message that is output by a speaker and/or a display coupled to, for example, the controller 73. Alternatively or in addition, such a sensor could trigger a door handle actuator 1140, as discussed above and shown in FIG. 11.

In embodiments of the disclosed subject matter, a smart-home environment may include one or more intelligent, multi-sensing, network-connected entry detectors (e.g., “smart entry detectors”). Such detectors may be or include one or more of the sensors 71, 72 shown in FIG. 17. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIG. 17 can include one or more intelligent, multi-sensing, network-connected doorknobs or handles (e.g., “smart doorknob”). For example, the sensors 71, 72 may be coupled to a handle of a door (e.g., door handles 1120 and 1220 located on doors of the structure of the smart-home environment). However, it should be appreciated that smart doorknobs can be provided on external and/or internal doors of the smart-home environment.

Smart thermostats, smart hazard detectors, smart doorbells, smart wall switches, smart wall plugs, smart entry detectors, smart doorknobs, keypads, and other devices of a smart-home environment (e.g., as illustrated as sensors 71, 72 of FIG. 17 can be communicatively coupled to each other via the network 70, and to the controller 73 and/or remote system 74 to provide security, safety, and/or comfort for the smart home environment).

A user can interact with one or more of the network-connected smart devices (e.g., via the network 70). For example, a user can communicate with one or more of the network-connected smart devices using a computer (e.g., a desktop computer, laptop computer, tablet, or the liek) or other portable electronic device (e.g., a smartphone, a tablet, a key fob, and the like). A webpage or application can be configured to receive communications from the user and control the one or more of the network-connected smart devices based on the communications and/or to present information about the device’s operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Figure 18:
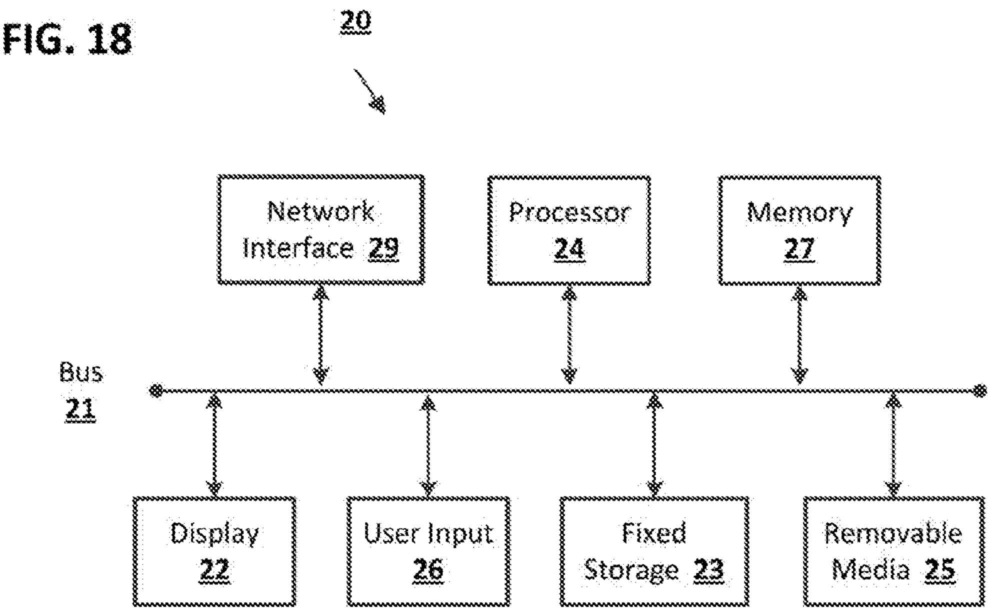
FIG. 18 illustrates a processing system or device, according to an embodiment of the disclosed subject matter.

Embodiments of the presently disclosed subject matter may be implemented in and/or used with a variety of computing devices. FIG. 18 is an example computing device 20 suitable for implementing embodiments of the presently disclosed subject matter. For example, the device 20 may be used to implement a controller that performs the processing of FIG. 15 for example, or a device including sensors as disclosed herein or the like. Alternatively or in addition, the device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth(R), near-field, and the like. For example, the network interface 29 may allow the device to communicate with other computers via one or more local, wide-area, or other communication networks, as described in further detail herein.

Figure 19:
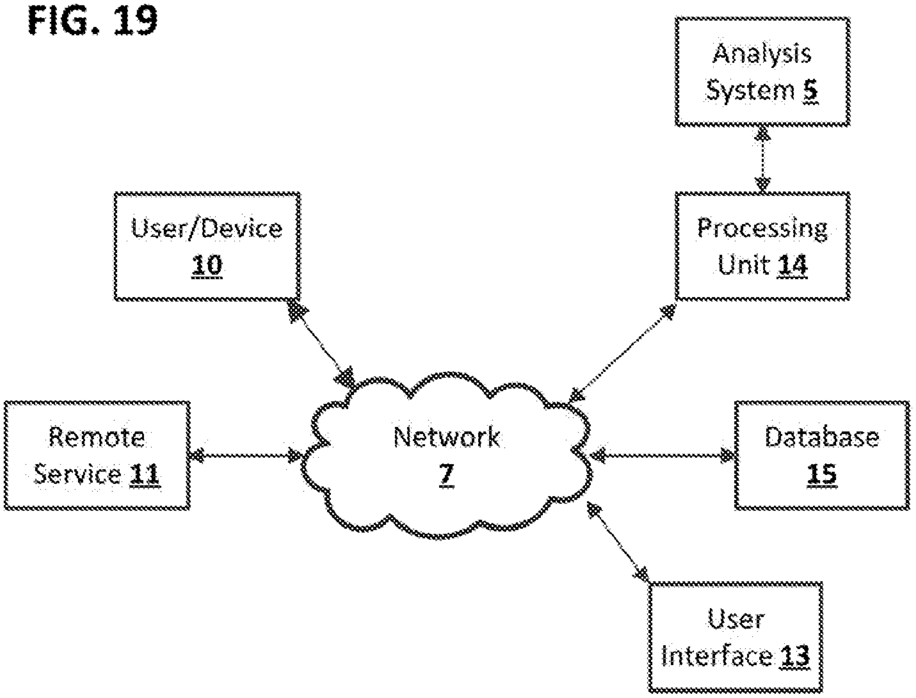
FIG. 19 illustrates a networked processing environment of an embodiment of the disclosed subject matter.

FIG. 19 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A door lock apparatus, comprising:

a male component;

a connection to a power source;

a lock actuator, powered by the power source and configured to move the male component at least partially through a strike and into a box beyond the strike in the path of the male component to lock a door, wherein the male component comprises a plurality of parallel subcomponents oriented lengthwise in the direction of a path of the male component;

a bed of sensors positioned in the box and configured to sense a number of parallel subcomponents that contact the bed after the male component has been moved into the box; and an alarm in communication with the bed, wherein the alarm is triggered when an attempt is made to lock the door and an insufficient number of parallel subcomponents contacting the bed has been sensed by the bed of sensors.

2. The apparatus of claim 1 wherein the lock actuator and the male component, when the door is unlocked, are positioned in a door, and the strike and the bed are positioned in a corresponding location in a door jamb.

3. The apparatus of claim 2 wherein the power source comprises a battery.

4. The apparatus of claim 3, further comprising a first induction coil wherein the battery is configured to be charged inductively by the first induction coil.

5. The apparatus of claim 4, further comprising a second induction coil positioned in the door jamb wherein the second induction coil, when energized, creates a field that induces current in the first induction coil.

6. The apparatus of claim 3, wherein the battery is charged with harvested energy.

7. The apparatus of claim 6, wherein the harvested energy is harvested from one or more of: motion of the door; motion of a door handle; pressure applied by walking or standing on a pressure plate; a solar array; and a temperature gradient.

8. The apparatus of claim 1, wherein the lock actuator and the male component, when the door is unlocked, are positioned in a door jamb, and the strike and bed are positioned in a corresponding location in the door.

9. The apparatus of claim 8, wherein the power source comprises one or more of: a household power source; a telephone landline power source; and an Ethernet power source.

10. The apparatus of claim 8, wherein the power source comprises a battery.

11. The apparatus of claim 10, when the battery is configured to be charged with harvested energy.

12. The apparatus of claim 11, wherein the harvested energy is harvested from one or more of:

motion of the door;

motion of a door handle;

pressure applied by walking or standing on a pressure plate in a floor;

a solar array; and a temperature gradient.

13. The apparatus of claim 12, wherein the temperature gradient exists between a temperature on a first side of the door and a temperature on a second side of the door.

14. The apparatus of claim 1, where in the parallel subcomponents are approximately 2 millimeters in width.

15. The apparatus of claim 1, wherein the parallel subcomponents are hexagonal in cross-section.

16. The apparatus of claim 1, further comprising an authentication module, configured to permit opening of the door when an authentication process, performed by the authentication module, is successful.

17. The apparatus of claim 16, wherein the authentication module comprises: an authentication input module; and authentication logic figured to perform the authentication process.

18. The apparatus of claim 17, wherein the authentication input module is configured to receive data from a user, the data characterizing one or more of: a fingerprint of the user; a face of the user; a voice of the user; and a retina of the user.

19. The apparatus of claim 1, further comprising: a door handle; a proximity sensor; and a handle actuator, wherein, when the proximity sensor detects a person or a token within a predetermined distance from the proximity sensor, the handle actuator moves the door handle from a recessed position to an extended position.

20. The apparatus of claim 1, wherein the lock actuator is configured to retract the male component from the strike if the lock actuator receives an indication of a fire.

21. The apparatus of claim 1, wherein lock actuator is configured to move the male component into the strike if the lock actuator receives an indication of a security threat.

22. The apparatus of claim 1, further comprising a retainer configured to move into a position to capture the male member once the male member has been moved into the box.

23. A method comprising:

after an attempt has been made to lock a door, determining a number of parallel subcomponents of a male component of a door lock apparatus that have contacted a bed of sensors in a box of a door lock apparatus;

comparing the determined number to a threshold minimum; and if the determined number is less that the threshold minimum, asserting an alert condition indicating that the door is not securely locked.

* * * * *